June 13, 1967  H. R. HEGGEN ETAL  3,325,822
CHART RECORDING MECHANISM
Original Filed June 28, 1962  2 Sheets-Sheet 1

H.R. HEGGEN
I.M. STARR
INVENTORS

BY Robert B. Smith

ATTORNEY

H. R. HEGGEN
I. M. STARR
INVENTORS

BY *Robert B. Smith*

ATTORNEY

United States Patent Office 3,325,822
Patented June 13, 1967

3,325,822
CHART RECORDING MECHANISM
Henry R. Heggen, Sunland, and Irvin M. Starr, San Fernando, Calif., assignors to The Bendix Corporation, a corporation of Delaware
Original application June 28, 1962, Ser. No. 205,948, now Patent No. 3,217,221, dated Nov. 9, 1965. Divided and this application Feb. 15, 1965, Ser. No. 446,755
3 Claims. (Cl. 346—136)

This application is a division of copending application Ser. No. 205,948, filed June 28, 1962, now Patent No. 3,217,221.

This invention relates to motor drive circuits for incremental step motors and, more particularly, to variable-speed control circuits for step motor-actuated mechanisms.

The pulse-actuated step motor has certain demonstrated advantages in electromechanical followup systems which require precise positioning of a mechanical indicator in response to an electrical pulse input signal. First, step motors produce a fixed increment of shaft rotation for each electrical pulse input and thereby may be driven directly from the output of a digital signal source. Secondly, a maximum speed of operation approaching that of continuously-rotating motors, while still affording precise positioning of the output shaft, is possible when the step motor is driven by an electronic pulse generator such as a multivibrator.

One particularly useful application of the step motor is in the chart and pen mechanisms of navigational system map displays. Such displays typically employ an elongated chart wound on a pair of spaced parallel rollers and advanced from one roller to the other by the stepped advance of a sprocket drive roller under the control of a step motor. Overlying the chart is a pen or other type of indicator which is mounted on a lead screw for movement transverse to the direction of movement of the chart, similarly under the control of a second step motor. In operation, the chart motor and pen motor are each driven by respective output signals from a navigational system whereby the pen or indicator traces the route of the vehicle carrying the system.

One particular operational requirement of such chart mechanisms encountered is the need for an overriding control to allow the user of the equipment to move the chart or pen, or both, to a new position. This may be used, for example, to correct for an observed error or to advance the chart to a different section. The correction of errors normally requires a short movement a fraction of an inch to a precise position. On the other hand, movement of the chart to a different section may require chart advance of several feet. In the latter case high-speed movement is a virtual necessity. Of course, both of these correcting modes of operation may be accomplished with a dual-speed drive system or an auxiliary reset system, and means for selecting the speed as well as the direction of movement.

It has been found that step motors which offer the required response and torque output for the normal computing mode of operation of the system do not have sufficient torque output for the additional load of a dual-speed gear system. Moreover the addition of a speed-selection switch to the operational controls of the system puts an unacceptable additional burden upon the harried pilot when used in aircraft installations.

With this background of step motor operated chart mechanisms in mind, it is an object of this invention to provide an auxiliary drive control system for chart mechanisms with a time dependent variable speed characteristic suitable for high speed reset operation and employing the primary drive motor.

Still another object of the invention is to provide a single operational control for both the chart and pen for positional corrections.

One further object is to provide a manually controlled, electrically operated drive system for repositioning the chart and pen of such display systems affording automatic low-speed operation for minor positions and high speed for major adjustments of either chart or pen.

These objects are all accomplished in accordance with this invention, one specific embodiment of which comprises a chart mechanism including one pulse-responsive motor for advancing a navigational chart mechanism and a similar motor for moving a pen relative to the chart. A pair of pulse generators controlled by an external signal input generates trains of pulses for operating the two motors. In a typical system, the pulse generators each may comprise two bistable transistor multivibrators. The first bistable multivibrator is connected to be triggered by incoming signals ordering a clockwise step of a motor. The second multivibrator is triggered by incoming signals ordering a counterclockwise step. The multivibrators are cross-connected through delay networks to in turn trigger the opposite multivibrator. By proper choice of delay, the multivibrator driver circuit will produce a pair of pulses of proper phase and duration to produce a single step movement of a step motor in the proper direction.

Chart mechanisms in accordance with the invention further include a manual control circuit for selectively moving the chart or pen. The manual control circuit employs a five-position "joy stick" switch having a central or neutral position and four operating positions: up (chart advance), down (chart return), left (pen left), and right (pen right). Movement of the "joy stick" in each case closes a pair of contacts applying a supply voltage to a network having a time-variable output voltage characteristic. The network serves as the timing voltage input to an astable multivibrator which in turn constitutes the trigger pulse source for the bistable multivibrator which drives the appropriate step motor in the same manner as the normal computation mode pulse source. Employing the manual control, movement of the "joy stick" in the proper direction energizes the manual drive circuit, and a train of pulses of continuously increasing frequency is applied to a step motor which in turn moves the chart beginning at a slow rate and accelerating to a maximum constant rate until the "joy stick" is released. Employing this invention, the manual control affords precise minor position correction, since short distance movements are made at slow speed, and as the distance traveled increases, the rate of travel increases automatically.

A more complete understanding of this invention may be had from the following detailed description and by reference to the drawing in which.

Figure 1:
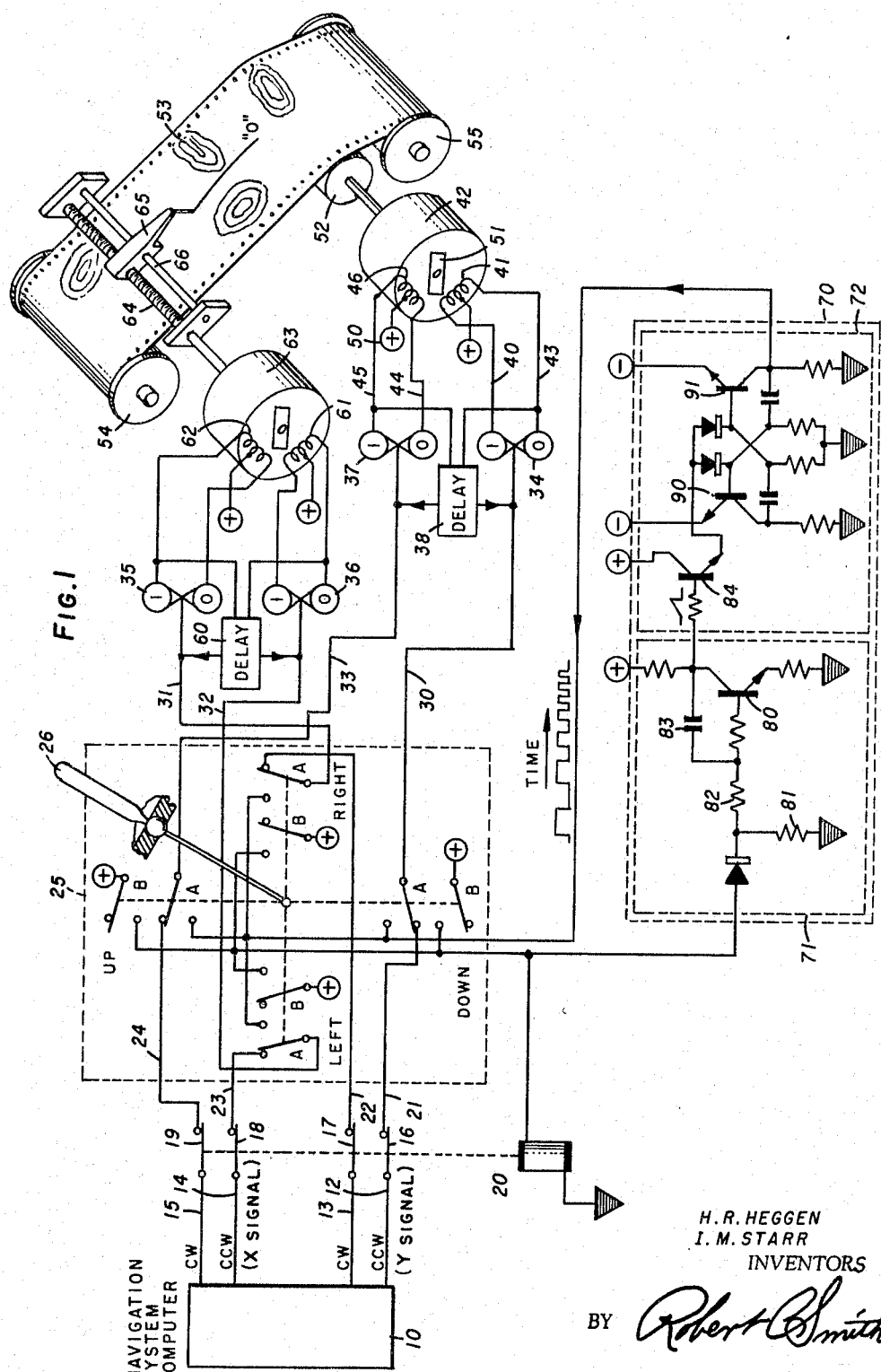
FIG. 1 is a block diagram of the automatic and manual drive systems of a navigational chart display employing the invention.

Now referring to FIG. 1, a typical navigation system with which this invention may be used is represented by the box 10 constituting the navigational computer having illustratively a pair of antennae 11 as the information input source and two pairs of output conductors carrying pulses for controlling the information display.

Navigation systems of the inertial, radio, radar, or dead-reckoning type may form the information source for the display system incorporating this invention. The prime requisite of the navigational system is that it produce a train of pulses on either lead 12 or 13 proportional to the distance made good along the longitudinal or Y axis of the chart and a train of pulses on either lead 14 or 15 proportional in number to the distance made good along the transverse or X axis of the chart. Hereinafter the information on leads 11 and 12 is termed the chart drive signal, and that on leads 13 and 14 is the pen drive signal. More specifically, a train of pulses appearing on lead 13 indicates advance along the Y axis, and similar pulses on lead 14 represent movement in the opposite direction. Pulses appearing on leads 14 or 15 represent movements along the X axis.

The leads 12–15 are connected through normally closed contacts 16–19, respectively, of isolating relay 20 to input conductors 21–24 of a multidirectional type switch 25. The switch 25 includes a manual operator or "joy stick" 26 normally centered in its inoperative condition and movable selectively in any of four quadrature directions, designated as up, down, left and right, to operate a pair of switches A and B at the quadrature positions. Normally the input conductors 21–24 from the navigation system are connected through the back contacts of the four A contacts of switch 25 to the conductors 30–33, respectively, which in turn constitute the triggering input leads to respective bistable switching elements 34–37.

The switching element 34 is representative of all four and includes a pair of silicon-controlled rectifiers, one of which is normally in saturated condition, identified by the numeral "1," and the other of which is cut off, identified by numeral "0."

Figure 3:
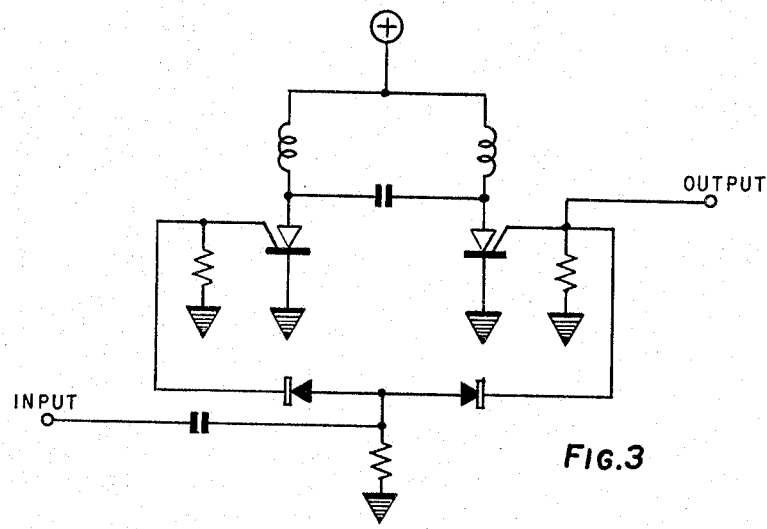
FIG. 3 is an electrical schematic of the monostable multivibrators of FIG. 1.

As indicated in the drawing in both FIG. 1 and FIG. 3, illustrating a typical multivibrator 34–37, the multivibrator stages "1" and "0" are both triggered symmetrically by pulses arriving over respective leads 30–33. Referring again to illustrative multivibrator 34, the upper stage identified by the "1" is connected through lead 40 to one end of a field winding 41 of a rotary step motor 42. The lower stage "0" is connected to the opposite end of winding 41 by lead 43, and a center tap to a potential source 44. The multivibrator 37, similar to multivibrator 34, has a symmetrically connected triggering input lead 33 and output connections over a pair of leads 44 and 45 to opposite ends of a second winding 46 of motor 42.

The winding 46 is similarly center-tapped to a power source 50. The windings 48 and 46 are illustrated in their functional rather than actual physical relationship, in that they are actually distributed around the field structure so as to produce a 90° stepped advance to a permanent magnet rotor 51 when pulses are applied alternately to the windings 41 and 46. The alternate application of pulses to windings 41 and 46 is achieved in response to a single pulse applied to either lead 30 or 33 by means of cross connections from both "0" stages through delay network 38 to the triggering input to the opposite multivibrator. The direction of stepped advance of the rotor 51 depends upon which lead 30 (counterclockwise) or 33 (clockwise) receives a pulse from the navigation system 10. The motor 42 is coupled through appropriate gearing to a chart sprocket 52 driving a navigation chart 53 from a supply drum 54 to a takeup drum 55. The drums 54 and 55 may be driven by a separate motor or spring-loaded, as the particular system may require.

A second identical array of multivibrators 35 and 36, a delay network 60, and windings 61 and 62 of a step motor 63, are all used to drive a lead screw 64 in response to pulses applied to leads 31 or 32 from the pen drive output conductors 14 and 15 of the navigation system 10. This drive system controls the position of an indicator, preferably a marking pen assembly 65 which travels transverse to the direction of chart movements on guide bar 66. With this arrangement, the proper application of pulses to the leads 21–24, the chart 53, and pen assembly 65 results in the marking of a path from the point of origin "0" of the mission along the route covered by the vehicle carrying the system.

The electrical connections and operation described above constitute the normal control of the chart mechanism by the navigation system 10 with the manual control, joy stick 26, in its neutral position. Upon a movement of the control 26 in any direction, however, the input connection from the navigation system 10 is apart from the navigation system by operation of the isolation relay 20 under control of the B contacts of the joy stick 26. Simultaneously a local pulse generator 70 including a time-variable voltage generator 71 and a voltage-controlled astable multivibrator oscillator 72 is connected through the off-normal A contacts of the joy stick 26.

The time-variable voltage generator 71 is preferably an RC integrating circuit employing the capacitance multiplication effect of a transistor 80. The RC network includes the resistances 81 and 82 in combination with capacitor 83. Typical values for these components are:

| | |
|---|---|
| Resistance 81 _____ohms___ | 100,000 |
| Resistance 82 _____do____ | 10,000 |
| Capacitance 83 _____µfd__ | 6.8 |

The time constant of the combination is approximately 0.75 second, but transistor 80 for example, an NPN silicon transistor, Type 2N697, and a collector resistance 86 exceeding in value the emitter resistance 85 by a factor of 10 (e.g., 22,000 ohms and 2,200 ohms) results in an effective multiplication of the capacitance 83 to obtain a time constant for the stage of approximately 7.5 seconds.

Figure 2:
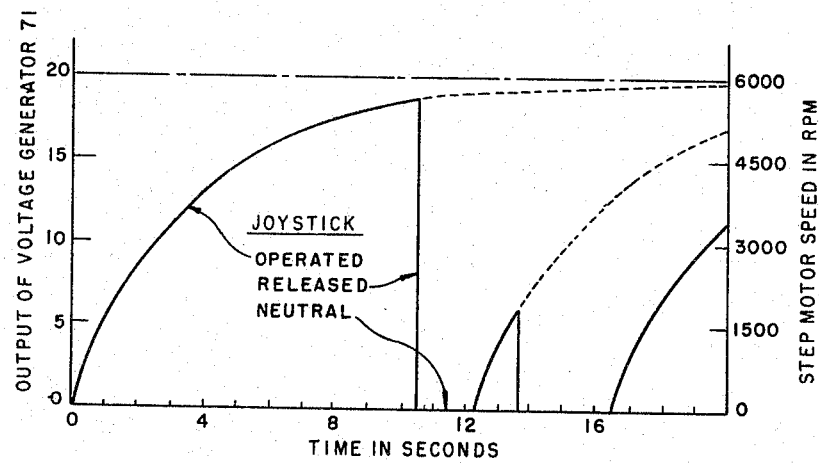
FIG. 2 is a graphical representation of a typical time-variable response of the manual controlled-drive system of FIG. 1.

The time-voltage characteristic of the variable voltage generator 71 and motor response are illustrated in FIG. 2. The output of the generator 71 includes an amplifier stage 84 which provides a variable unidirectional voltage for varying both the period and "on" time of a pulse generator 72 of conventional astable transistor multivibrator design. The frequency or repetition rate of the multivibrator 72 varies directly with the level of bias applied to the base electrodes of its transistors 90 and 91 by the amplifier 84. Immediately upon release of the joy stick 26 the bias returns to the minimum normal value and the integrating circuit 71 is rapidly reset. Upon the next operation of the joy stick the energized motor starts at the minimum rate. Typically, reset times for the integrator 71 are 0.2 to 0.25 second. Consequently the same graphical representation of FIG. 2 shows the characteristics of variable voltage generator 71 applied to the pulse generator 72, and the step motor speed, as may be seen by reference to the right hand ordinate scale of FIG. 2.

The output of the free running multivibrator 72 is taken from the collector of transistor 91 and applied through lead 92 and the closed back contact A of the switch operated by the joy stick 26 to apply the increasing frequency train of pulses to the appropriate lead 30–33. This results in the operation of the appropriate step motor 42 or 63 in the correct direction to move either the pen assembly 65 or the chart 53 at an accelerating rate in the required direction.

In a typical case where the user of the system observes a minor deviation, e.g., one-quarter inch, from the indicated chart position from his actual location, he merely moves the joy stick 26 in the required direction, and the chart or pen assembly will commence the correcting movement at a slow rate, for example, one-fourth inch per second. Upon the release of the joy stick, movement of the pen or chart under the local pulse generator 70 is terminated, and the navigation system resumes control upon the release of isolation relay 20.

Where the user desires to shift to a totally different section of the chart, he merely operates the joy stick 26 in the same manner, and the chart or pen assembly is advanced at an accelerating rate which approaches a rate of four inches per second. Final positioning of the new area of the chart is accomplished by release of the joy stick 26, stopping chart or pen movement. This is followed by operation of the joy stick again, whereupon movement again begins but at the initial slow rate for precise final positioning. Therefore, employing this invention, both computing and slewing operation of a step motor mechanism is accomplished, the latter at a continuously variable rate to provide effective control of a navigational chart mechanism.

Although for the purpose of explaining the invention a particular embodiment thereof has been shown and described, other modifications within the spirit and scope of this invention will occur to persons skilled in the art. The scope of this invention is only limited by the appended claims.

We claim:

1. A movable chart-recording mechanism comprising:
   an elongated chart;
   a pair of drums for storing said chart with an exposed portion thereof extending between said drums;
   first pulse-operated motor means for advancing said chart from one of said drums to the other and return;
   an indicator assembly including a portion adjacent to the exposed portion of said chart for identifying a particular portion thereof;
   second pulse-operated motor means for moving said indicator assembly transverse to the direction of movement of said chart;
   local pulse-generating means having a pulse repetition rate increasing for at least the first several seconds of operation; and
   switch means for selectively connecting an information pulse source or said local pulse-generating means to said pulse-operated motor means.

2. The combination in accordance with claim 1 wherein said switch means is operative to energize said local pulse-generating means upon the connection thereof to said motor means.

3. The combination in accordance with claim 1 wherein said switch means is operative to connect said local pulse-generating means to one of said first or second motor means to produce movement of the chart or indicated assembly at a rate determined by the repetition rate of said local pulse-generating means.

References Cited

UNITED STATES PATENTS 2,857,234 10/1958 Murray _____ 346—8
3,160,851 12/1964 Ramsayer et al. _____ 346—8 X RICHARD B. WILKINSON, *Primary Examiner.*

J. W. HARTARY, *Assistant Examiner.*